Jan. 25, 1927.
J. E. PFLUEGER
1,615,803
ARTIFICIAL BAIT
Filed Dec. 19, 1923
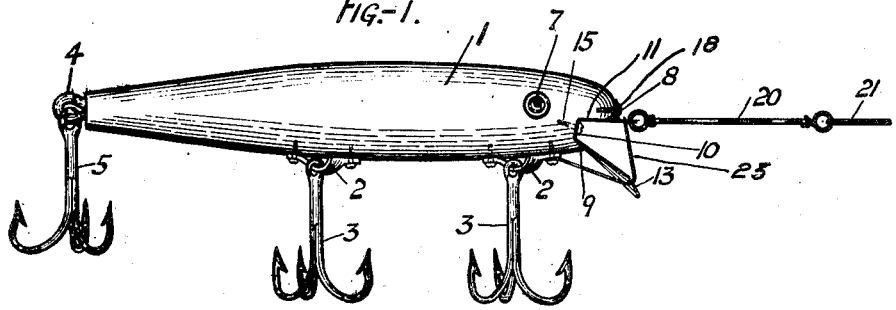
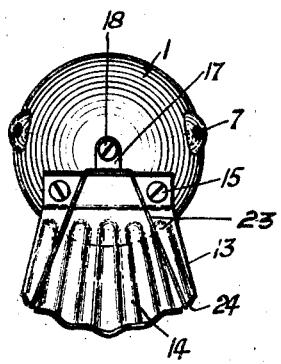
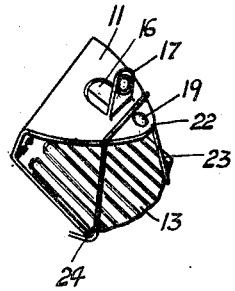
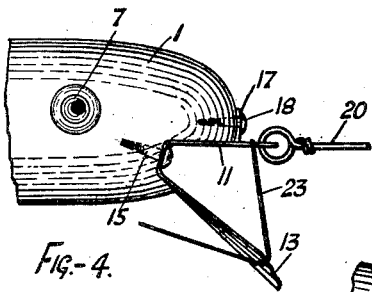
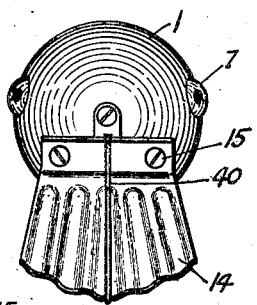
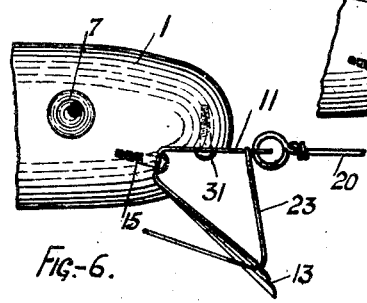
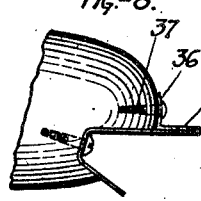
Inventor
JOSEPH E. PFLUEGER.
By A. L. Ely
Attorney.

Patented Jan. 25, 1927.

1,615,803

UNITED STATES PATENT OFFICE.

JOSEPH E. PFLUEGER, OF AKRON, OHIO, ASSIGNOR TO THE ENTERPRISE MANUFACTURING COMPANY, OF AKRON, OHIO, A CORPORATION OF OHIO.

ARTIFICIAL BAIT.

Application filed December 19, 1923. Serial No. 681,518.

The invention relates to artificial bait and particularly to that type of bait known as wiggling, wobbling and diving bait, which is so constructed and designed that while being drawn through the water, either in casting or trolling, the bait will be immersed and wiggle through the water in a manner imitating the movement of natural bait and very alluring to fish.

The present form of bait is designed as an improvement upon the bait shown and described in the Reynolds Patent No. 1,133,669, dated March 30, 1915, in which the forward end of the bait body is provided with a notch having a downwardly and forwardly sloping surface in combination with a metal diving plane, the purpose of the present invention being to improve upon the means for attaching the plane to the bait body and in affording a combined plane and draft line attaching means, the plane itself being so formed as to provide means for the attachment of the leader or line.

A further object of the invention is to design a bait which will have superior killing properties. The objects are attained by constructing and designing the bait so that as it is drawn through the water it will wiggle in an effective manner, the wiggling being in a straight line, that is, the bait will not dart from side to side in an undulating path. In this way the approaching game fish will be more likely to strike the bait. The center of movement of the bait body is located slightly forward of the center of the bait. The bait is so designed and constructed that there is no tendency for it to turn over in the water as it is being drawn in and this is true no matter at what speed the bait travels.

It is also an object of the invention to reinforce the diving plane so that it will not be easily bent out of shape, as may occur in other forms of diving planes. As in the Reynolds construction, the plane is reinforced by the surface of the bait body to which it is attached and also by the provision of a brace provided for the outer edge of the plane, the brace serving also as an effective weed guard.

Other objects and advantages will be apparent to those skilled in the art, which it is not necessary to set forth in full. The drawings show embodiments of the invention, but it is not necessary that the details shown therein be followed, as changes and modifications may be made within the scope of the invention and the claims attached hereto.

In the drawings:

Figure 1 is the preferred form of my improved bait as shown in side view;

Figure 2 is a front view thereof;

Figure 3 is a perspective view of the diving and wiggling plane removed from the bait;

Figure 4 is a side view of the forward portion of the bait;

Figure 5 is a front view of the bait showing a modified form of brace;

Figure 6 is a side view of a modified form of the plane attaching means;

Figure 7 is a perspective view of a portion of the plane shown in Figure 6; and

Figure 8 is a modified form of the invention.

The bait shown in Figures 1 to 4 inclusive comprises the usual fish-shaped body portion 1, which is made of wood or other buoyant material so that when idle the bait will float upon the top of the water. The under side of the body has secured to it loops 2 from which are suspended the freely swinging multiple hooks 3, and to the tail is secured the screw eye 4 from which depends the tail hook 5. Eyes 7 may be located in the head of the bait.

The forward position of the body is provided with a generally V-shaped notch or mouth having a horizontal wall 8 and a lower inclined wall 9 which meet at the vertex 10 of the notch. Within the mouth is secured the diving plane which is formed with a flat portion 11 adapted to fit against the surface 8. The major portion of the diving plane extends downwardly in a flaring fan-shaped web 13, the lower portion of which extends into the water so that as the bait is drawn inwardly by the line, it will be directed downwardly in the water and will travel in a line a slight distance below the surface.

The diving plane serves to give the bait the wiggling motion as it is drawn through the water and is preferably slightly scooped or dished and may be provided with radially extending flutes or corrugations 14, both of these features tending to improve the wiggling action of the bait, in addition to which the flutes catch and reflect the light, rendering the bait more alluring. The transverse surface of the plane affords sufficient resistance to the forward movement of the body to impart a sharp, well defined and regular wiggle or oscillation to the body of the bait so that it simulates the wiggling movement of the fish through the water. Screws 15 are passed through the vertex of the plane into the bait body to secure the plane in position.

The horizontal wall 11 may be attached to its surface by any suitable means. In the form of the invention shown in Figures 1 to 4 inclusive, the horizontal wall 11 is cut out as shown at 16 in Figure 3 along a U-shaped line and the tab of metal 17 formed thereby is bent upwardly to rest against the nose of the bait, a screw 18 passing through the tab and entering the bait body to secure the plane in position. A hole 19 is formed in the forwardly projecting portion 22 of the plane through which the usual wire leader 20 is secured and to which latter the line 21 is fastened.

A combined weed guard and brace may be provided across the front of the diving plane. In the forms shown in Figures 1 to 4 inclusive, this is constituted in a light wire 23 which passes over the projection 22 on the forward portion of the part 11. The two arms of the brace are passed down over the front of the diving plane near its outer corners where they are positioned by notches 24 and are bent backwardly and attached to the body of the bait in any suitable manner. As shown in Figure 1, the wires are preferably secured on the under side of the body by one of the screws which holds the loop 2 in position. The wire or wires 23 are preferably under a slight tension so that they serve as a brace for the outer edge of the diving plane and prevent distortion or bending out of shape as may happen from various causes. The wires also serve as an effective weed guard and prevent weeds being caught in the throat or vertex of the diving plane.

The brace for the plane may take the form shown in Figure 5, in which a single wire 40 extends from the opening 19 to the center of the diving plane.

As a modification and substitute for the tab 17 for attaching the surface 11 to the wall 8, the construction shown in Figures 6 and 7 may be adopted. In this form a keyhole slot 30 may be formed in the wall 11 which is passed over a screw 31 secured in the wall 8. In attaching the plane the circular part of the slot is passed over the screw 31 and the plane pushed back until the screw engages the narrow portion of the slot. In this manner the upper wall of the plane will not bend downwardly.

In Figure 8, that portion of the plane which projects outwardly and to which the line is attached is formed in a different manner from that shown in the other figures. The metal is bent backwardly upon itself so as to form a double thickness at this point, where it is apertured, as at 35, for attachment of the leader 20. The end of the metal piece is bent upwardly to form an ear 36 through which the screw 37 is passed. The construction here shown provides a stronger and more rigid point for the attachment of the line, and may be preferred for that reason.

In any one of the modifications which has been described, it will be observed that the diving plane is securely attached to and braced by the body of the bait. In any form of the invention the plane may be provided with the radial flutes or other multiplicity of surfaces to catch and reflect the light.

In drawing the bait through the water, the forwardly and downwardly extending diving plane causes the bait to be immersed in the water and to travel below the surface. The transverse surface of the plane causes the bait to wiggle in its forward movement, and the planes are reinforced and braced by the bait body. The diving plane is preferably of bright metal to catch and reflect light rays, a result that is accentuated by the provision of the many surfaces formed upon the plane by fluting or otherwise.

Detailed construction of the invention may be varied as desired. The number and location of the pendant hooks may be changed, the shape of the body may be modified, and other details and refinements adopted within the skill of the art and within the scope of the attached claims. The principles of the invention may be used in other forms than in the minnow form as shown.

What I claim is:

1. In an artificial bait, a bait body having an angular transversely arranged notch in its forward end, and a piece of metal shaped to fit in said notch and having one side thereof extending below the bait body to form an inclined diving plane and having its other side provided with an attachment for the line.

2. In an artificial bait, a bait body having a transversely arranged notch in its forward end, a piece of metal shaped to fit in said notch and having one side thereof extending below the bait body to form an inclined diving plane, means located at the vertex of the notch to secure the metal to the bait body, and means located at the forward end of the body for the attachment of the line.

3. In an artificial bait, a bait body having a notch in its forward end, a metal strip seated within the notch and secured to the body, the metal strip being formed with angularly arranged planes, one of said planes extending below the body to provide a forwardly and downwardly extending diving and wiggling plane the other plane extending horizontally, and means formed on the other plane for attachment of the line.

4. In an artificial bait, a bait body having an angular transversely arranged notch in its forward end, and a metal strip conforming to and seated within the notch and secured to the body, the metal strip having a portion to constitute a diving plane and a second portion formed with an eye for attachment of the line.

5. In an artificial bait, a body, a substantially V-shaped notch cut in the body, an angular plate across the front of the body and secured at the vertex of the notch, and additional securing means for the plate at its upper portion.

6. An artificial bait having a body portion and a diving plane secured thereto and extending outwardly therefrom, and bracing members extending from the body to the corners of the plane.

7. An artificial bait having a notch in its forward end and a weed guard across the notch.

8. An artificial bait having a notch in its forward end, a diving plane fastened within said notch and extending forwardly and downwardly from the body, and a weed guard attached to the body and spanning the notch and the plane.

9. An artificial bait having a V-shaped notch in its forward end, a wiggling and diving plane secured within and braced by the walls of said notch, said plane having forwardly and downwardly extending portions, and wires extending across the notch and the plane and engaging the portions of the plane.

10. An artificial bait comprising a bait body, a metallic plate attached to the end thereof to form a diving and wiggling plane, and a reinforced extension on the plate to which the line may be attached.

11. An artificial bait comprising a bait body, a metallic plate attached to the end thereof to form a diving and wiggling plane, and an extension formed for attachment of the line, said extension comprising a double thickness of the metal plate.

12. An artificial bait comprising a bait body, a notch cut in the forward end of the bait body, a metal plate having two surfaces angularly disposed to one another, one of said surfaces lying along the upper wall of the notch and provided with an integral portion extending beyond the front end of the bait body and providing a point of attachment for the line, the other surface extending forwardly and downwardly of the bait body and constituting a diving plane.

13. An artificial bait comprising a bait body, a notch cut in the forward end of the bait body, a metal plate having two surfaces angularly disposed to one another, one of said surfaces lying along the upper wall of the notch and provided with an integral portion extending beyond the front end of the bait body and providing a point of attachment for the line, the other surface extending forwardly and downwardly of the bait body and constituting a diving plane, means for securing the plate at the vertex of the notch and additional means for securing the plate to the body adjacent the point of attachment for the line.

14. An artificial bait comprising a bait body, an angularly formed plate at the forward end of the bait body, one surface of said plate extending forwardly of the bait body and providing a point of attachment for the line, the other surface of said plate extending forwardly and downwardly of the bait body and constituting a diving plane.

15. An artificial bait comprising a bait body, an angularly formed plate at the forward end of the bait body, one surface of said plate extending forwardly of the bait body and providing a point of attachment for the line, the other surface of said plate extending forwardly and downwardly of the bait body and constituting a diving plane, means for securing the plate to the bait body at its vertex, and additional means for securing the plate to the body adjacent the point of attachment for the line.

JOSEPH E. PFLUEGER.